Feb. 16, 1954   A. FISHMAN   2,669,356
CHUTE FOR FLOUR SIFTERS
Filed April 21, 1950
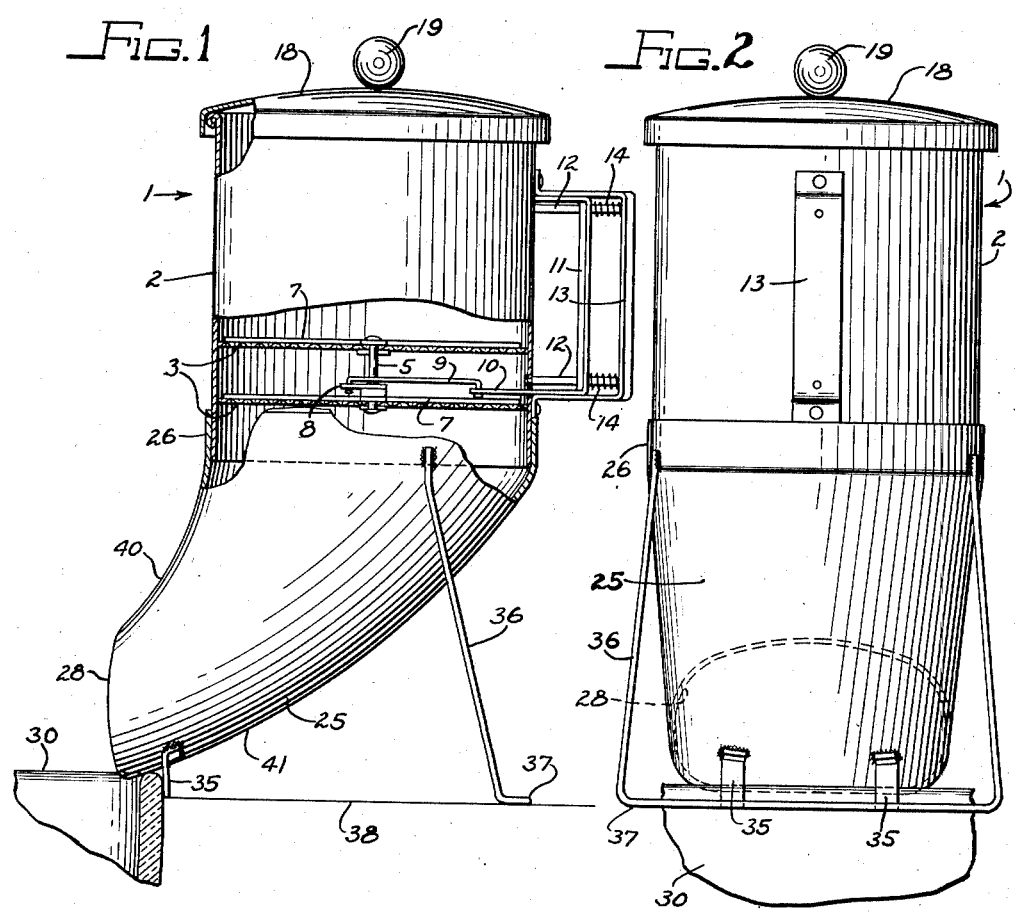
Inventor
Anita Fishman
by: Morris Spector
Atty.

Patented Feb. 16, 1954

2,669,356

UNITED STATES PATENT OFFICE 2,669,356

CHUTE FOR FLOUR SIFTERS

Anita Fishman, Chicago, Ill.

Application April 21, 1950, Serial No. 157,249

1 Claim. (Cl. 209—257)

This invention relates to chutes for flour sifters, particularly home type sifters, and is particularly applicable to hand operated sifters, although the invention is not limited to use with hand operated sifters.

In home baking it is frequently necessary to add sifted flour to a bowl the contents of which are at the same time being mixed by the usual domestic electric mixer. Such mixers consist of one or more motor driven beaters that extend into a bowl that contains the ingredients to be mixed, which bowl may be stationary or may be slowly rotated. Generally the beaters of the mixing apparatus are in a position which interferes with the holding of a flour sifter directly above the bowl into which the flour is to be sifted. As a result, it is usual procedure first to sift the flour into a second bowl and then pour it into the mixing bowl. It is one of the objects of the present invention to provide a chute for a flour sifter having an outlet so arranged as to facilitate sifting of the flour directly into the mixing bowl while the sifter is in a position to one side of the mixing bowl. In accordance with the preferred embodiment of the present invention the sifter may be of any well known type having a discharge opening in its bottom regions. The improved chute comprising the present invention extends around the bottom discharge opening of the sifter and is directed downwardly and to one side of the vertical center line of the sifter. This chute may be an integral part of the body of the sifter or it may comprise a separate unit to be readily attached to and detached from a domestic sifter. It is a further object of the present invention to provide a chute for a domestic flour sifter which chute has a large opening to permit free flow of flour therethrough without the same becoming compacted, and which chute embraces the full bottom outlet of the sifter and extends downwardly and to one side of the sifter. It is a still further object of the present invention to provide a chute for a flour sifter of the above mentioned character which chute is adapted to rest directly upon a mixing bowl that is to receive the sifted flour, for discharging into the mixing bowl, while the sifter itself is in a position to one side of the bowl.

The attainment of the above and further objects of the present invention will be apparent from the following specification taken in conjunction with the accompanying drawing forming a part thereof.

In the drawing:

Figure 1 is a side view, in partial section, of a flour sifter showing the improved chute of the present invention applied thereto;

Figure 2 is a rear view thereof;

Figure 3 is a top view thereof drawn to a smaller scale;

Figure 4 is a front view thereof; and

Figure 5 is a fragmentary side view of the bottom portion of the chute of Figure 1 and showing an alternative construction.

Reference may now be had more particularly to the drawing wherein like reference numerals designate like parts throughout.

In the drawing there is shown, at 1, a conventional domestic type flour sifter of one particular kind. It is, however, to be understood that the invention is not limited to the precise sifter here shown but is equally applicable to other types of sifters. In general the sifter comprises a cylindrical body 2 open at its top and at its bottom and having one or more wire screens or sieves 3 adjacent the bottom thereof. A wire rod 5 is rotatably mounted and extends through the sieves with its longitudinal axis coincident with the longitudinal axis of the cylindrical body 2. The wire rod carries a number of wire spiders or scrapers 7 keyed thereto and rotatable therewith, each wire spider or scraper being thereby rotated over one of the sieves 3. The wire rod 5 is adapted to be oscillated as by a crank 8 secured thereto and a connecting rod 9 pivoted to the crank at one end and at its opposite end pivoted to a reciprocable bar 10 that is an integral part of a gripper 11 that is manually slidable in two guide bars 12—12 that extend between the cylindrical casing 2 and the handle portion 13 that is suitably secured to the cylindrical body. Compression springs 14—14 between the gripper 11 and the handle portion 13 urge the gripper 11 in one direction. The vertical bar 13 of the handle and the gripper 11 are both gripped in the palm of one hand and by drawing the gripper 11 towards the vertical bar 13 of the handle and then releasing the same the crank 8 is oscillated to oscillate the rod 5 and the wire spiders or scrapers 7 in a manner usual in the art. The portion of the flour sifter thus far described is well known in the art and, per se, constitutes no part of the present invention.

The cylindrical body 2 is provided with a removable cover 18 that makes a slip friction fit with the cylindrical body and is provided with a pick-up knob 19. This is of importance from the sanitary point of view and from the point of view of reducing the spread of flour dust within the room, since some people are allergic to that dust.

A flour chute 25 is provided. This chute may be made of sheet metal or of molded plastic, as desired. The upper end 26 of the chute is circular in shape and makes a snug sliding fit onto the bottom of the body 2 of the sifter and is held thereon by frictional engagement therewith. The chute 25 curves downwardly from its upper circular end and terminates in a discharge outlet 28 of a generally flattened oval shape the major axis of which is slightly smaller than the diameter of the upper end 26 and the minor axis of which is appreciably smaller, as may be seen in Figure 2. The bottom of the discharge outlet 28 is adapted to rest on the rim of a bowl, such as a bowl 30, into which the sifted flour is to fall. Since the bowl 30 is of a circular shape it is desirable that the bottom of the chute 25 should have the corresponding curvature in order to facilitate seating of the bottom of the chute along the rim of the bowl 30 with the bottom of the chute overhanging the inside of the rim of the bowl 30. As a result the bottom edge of the chute 25 is curved to correspond in a measure to the curvature of the bowl, but it is not necessary that there be an accurate correspondence in this respect.

The outside of the chute is provided with a pair of projections 35—35 which serve two separate functions. During use of the sifter the projections 35 fit against the outside of the rim of the bowl 30 and thus serve to position the outlet 28 properly with respect to the top of the bowl. When the sifter is not in use over the bowl 30 the projections 35 together with a wire or plastic leg 36 serve as a support for the flour sifter with the attached chute 25. To that effect the wire 36, which constitutes a supporting leg, is in the form of a U-shaped wire the bight portion 37 of which is straight and constitutes one supporting leg and the arms of which wire are suitably secured to the outside of the chute 25 adjacent the top thereof, either by welding or soldering in the case of metal to metal, or by a suitable cement in the case of plastic to plastic. The bottom 37 of the wire support 36 is at the same level as the bottom of the projections 35 when the longitudinal axis of the sifter is in the vertical position as indicated by the horizontal line 38. As a result the sifter with the flour therein may be positioned on a work table and will remain in its vertical position.

The structure illustrated in Figure 5 is substantially the same as that of Figure 1 except that the outlet 28 instead of being in a substantially vertical position as in Figure 1 is here indicated at 28' in a substantially horizontal position. This result is obtained merely by extending the upper portion 40 of the chute to the level of the lower curved portion 41 thereof so that the outlet 28' faces horizontally instead of in a generally vertical direction as in the structure of Figure 2. This facilitates use of the sifter when sifting flour into a cup or other receptacle.

In compliance with the requirement of the patent statutes I have here shown and described a few preferred embodiments of my invention. It is, however, to be understood that the invention is not limited to the precise constructions here shown, the same being merely illustrative of the principles of the invention. What I consider new and desire to secure by Letters Patent is:

A chute for cylindrical flour sifters of the type having a circular discharge opening at the bottom thereof, said chute comprising an elbow-like funnel member having an upper circular rim adapted to be telescopically received on the lower end of the sifter with the rim completely encompassing the discharge opening and in register therewith, said chute being adapted to be frictionally supported by the sifter when the latter is manually held in an elevated position above the level of a supporting surface, said chute, when thus positioned on the sifter, extending generally downwardly and outwardly in one direction away from the vertical axis of the sifter and tapering inwardly to provide a discharge outlet of relatively small transverse area, a supporting frame in the form of a loop having upper ends secured to the opposite sides of the chute in the upper regions thereof and having its base projecting below the level of said discharge outlet, means providing a shoulder on said chute adjacent the bottom thereof in the vicinity of said discharge outlet for engaging the rim of a receptacle to locate the chute in discharge relationship with the extreme peripheral regions of the receptacle when the attached sifter is maintained in an elevated position with its axis extending vertically, said shoulder also constituting a supporting leg for the chute and extending downwardly below the discharge opening of the chute to the plane of the lowermost level of said supporting frame whereby said chute may be supported solely by said shoulder and supporting frame from a supporting surface with the attached sifter remaining in a vertical position.

ANITA FISHMAN.

References Cited in the file of this patent

UNITED STATES PATENTS

| Number | Name | Date |
|---|---|---|
| 397,737 | Marshall | Feb. 12, 1889 |
| 818,063 | Vuillemot | Apr. 17, 1906 |
| 915,078 | Deverman | Mar. 16, 1909 |
| 1,871,824 | Richburg | Aug. 16, 1932 |
| 2,130,964 | Minkiewitz | Sept. 20, 1938 |
| 2,244,186 | Braun | June 3, 1941 |
| 2,409,497 | Kessel | Oct. 15, 1946 |
| 2,416,810 | Bailey | Mar. 4, 1947 |
| 2,523,546 | White | Sept. 26, 1950 |

FOREIGN PATENTS

| Number | Country | Date |
|---|---|---|
| 402,747 | Germany | Sept. 24, 1924 |